United States Patent [19]
Heintzeman

[11] Patent Number: 5,655,583
[45] Date of Patent: Aug. 12, 1997

[54] TENONIZER APPARATUS AND STAIRCASE METHOD

[76] Inventor: Michael G. Heintzeman, 8200 Semmler Rd., Nisswa, Minn. 56468

[21] Appl. No.: 521,997

[22] Filed: Aug. 31, 1995

Related U.S. Application Data

[63] Continuation-in-part of Ser. No. 994,529, Dec. 21, 1992, abandoned.

[51] Int. Cl.$^6$ ............................... B23Q 3/00; B27F 1/10
[52] U.S. Cl. ............... 144/204.2; 144/2.1; 144/203; 144/205; 144/345; 144/347; 144/355; 83/409; 83/425; 142/1
[58] Field of Search ............... 83/413, 409, 435.1, 83/437, 875, 431, 425; 144/2.1, 202, 203, 138, 154, 198.1, 204.2, 344, 345, 347, 355; 142/1, 35

[56] References Cited

U.S. PATENT DOCUMENTS

| | | |
|---|---|---|
| 2,777,485 | 1/1957 | Farrow . |
| 4,732,182 | 3/1988 | Gorsha . |
| 4,899,795 | 2/1990 | Hackett . |
| 4,915,149 | 4/1990 | Herenyi et al. ............... 144/203 |
| 5,020,578 | 6/1991 | Jennings . |
| 5,065,802 | 11/1991 | Peterson . |

*Primary Examiner*—W. Donald Bray
*Attorney, Agent, or Firm*—Rick Martin

[57] ABSTRACT

A tenonizer apparatus has a motor and a circular cutting blade assembly mounted on a pivotable platform. A radius shoulder support shaft is pivotably mounted perpendicular to the circular cutting blade. The operator pushes and rotates the log along the shafts to create the tenon. Only one tenon can be cut at a time. A minimal set up time is required to switch between tenon types. The pivotable platform allows variable length tenons to be cut. The apparatus is portable.

20 Claims, 12 Drawing Sheets

TENONIZER APPARATUS AND STAIRCASE METHOD

CROSS REFERENCE PATENTS

The present application is a Continuation In Part (C.I.P.) of U.S. App. Ser. No. 07/994,529 filed Dec. 21, 1992, abandoned, by inventor Michael Heintzeman.

FIELD OF INVENTION

The present invention relates to a self contained tenonizer machine capable of cutting all types of circular tenons for use in mortise and tenon construction of furniture, staircases and the like.

BACKGROUND OF THE INVENTION

Traditionally tenon cutting for mortise and tenon fabrication has been a slow and tedious process, with the difficulty of cutting an accurate tenon increasing as you move away from machined material on which the tenon is to be cut.

The prior art discloses three basic approaches to producing circular tenons and their corresponding circular mortises. Hole saws, chucking machines having tenon bits, and lathes having either conventional or multi-cutter powered cutter heads are known in the prior art.

The present invention solves problems present in the prior art. The present invention may be used with any wood shape including irregularly shaped wood. The present invention produces tenons of variable size. The present invention is accurate within 1/32 of an inch and will produce a medium size tenon in less than 60 seconds.

The present invention offers numerous advances to the known prior art machines for cutting tenons. The present invention uses the concept of an imaginary control axis line running through the center of the raw log which is the workpiece. Axis holes are drilled at the two ends of the workpiece along the central axis. Then all types of circular tenons are cut by the present invention. A support shaft for either a radius shoulder tenon or a square shoulder tenon is provided. A single motor and dado blade assembly is used to cut either type tenon. Radius shoulder tenons up to nine inches long can be cut, and they are cut with the grain making a much smoother cut than the prior art. Square shoulder tenons can be cut up to four inches long. The present invention is job site portable. Minimal set up requirements exist when switching from radius shoulder to square shoulder tenons. Simple and fast adjustments permit changing tenon diameters and lengths within the two types of tenons. In summary the present invention provides a breakthrough in woodworking tools as well as a new method to build staircases using the new apparatus.

SUMMARY OF THE INVENTION

The primary object of the present invention is to provide a machine having a single motor and blade and two separate support shafts, one shaft for radius shoulder tenons and one shaft for square shoulder tenons.

Another object of the present invention is to provide for simple and fast set up changes for switching from radius to square shoulder cuts.

Another object of the present invention is to provide for simple and fast adjustment changes for varying the diameter and or length of the tenon.

Another object of the present invention is to provide for a radius shoulder cut with the grain.

Yet another object of the present invention is to provide a method for building staircases using the new apparatus.

Other objects of this invention will appear from the following description and appended claims, reference being made to the accompanying drawings forming a part of this specification wherein like reference characters designate corresponding parts in the several views.

The present invention consists of a cabinet mounted on wheels to provide portability. The cabinet supports an optional drill jig assembly for drilling the two central axis holes in the ends of the workpiece. The cabinet houses the single electric motor and dado blade assembly on a pivoting axis to provide for an adjustable tenon diameter. The cabinet supports a radius shoulder support shaft assembly which also has an adjustment means for an adjustable tenon diameter. An interchangeable set of support shafts provide for a variety of workpiece lengths and tenon diameters.

The cabinet also supports a square shoulder support shaft assembly which holds the workpiece perpendicular to the dado blade. A safety shield provides operator protection from flying wood chips.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
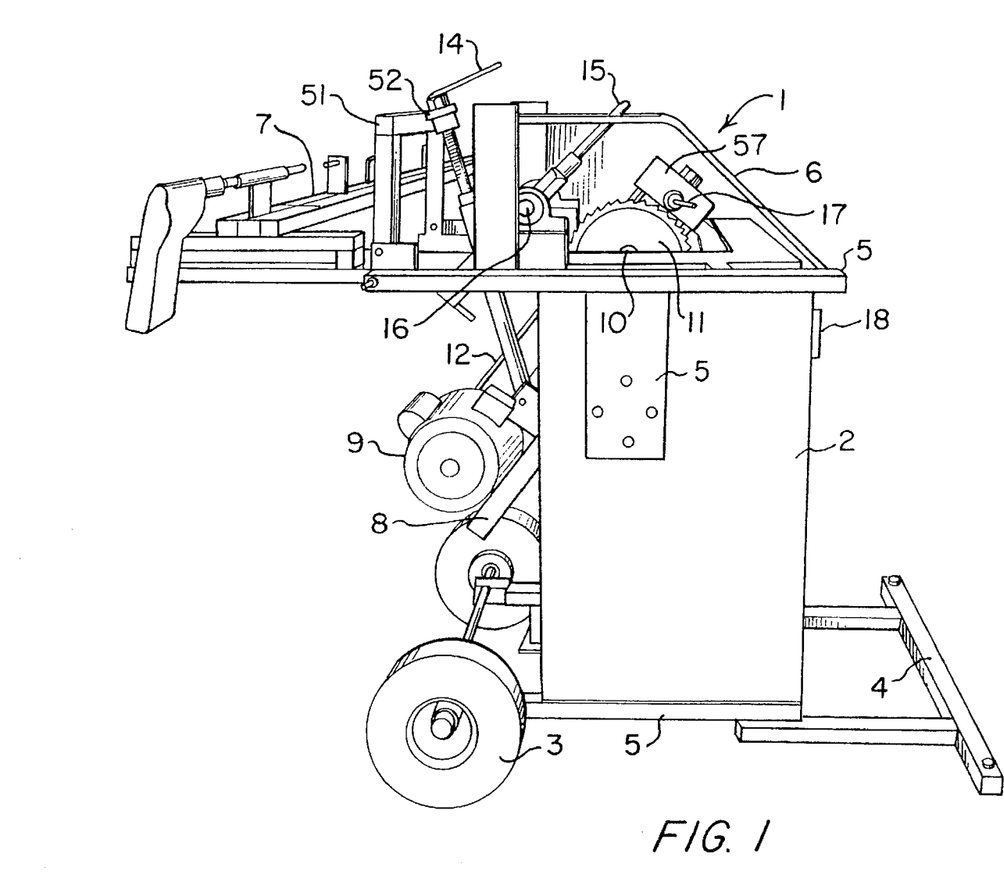
FIG. 1 is a left side perspective view of the preferred embodiment having an optional drill jig.

Referring first to FIG. 1 the tenonizer 1 has a cabinet 2 supported by wheels 3 and a stand 4. A frame 5 supports a safety shield 6 and an optional drill jig assembly 7.

A mounting platform 8 is supported by the frame 5. The mounting platform 8 supports a motor 9 having a belt 12, an arbor 10 having a dado blade 11 and a square shoulder mounting assembly 13. A power switch 18 controls the motor 9. A crank arm 14 adjusts the height of the dado blade 11 by pivoting the mounting platform 8. A radius shoulder support shaft 15 pivots around shaft 16. A square shoulder support shaft 17 remains stationary during the cutting operation. The radius shoulder cutting operation is performed independently from the square shoulder cutting operation. It is preferred that a different dado blade is used for each operation.

Figure 2:
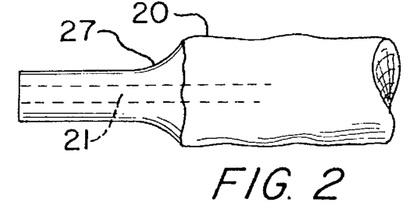
FIG. 2 is a side plan view of a workpiece having a radius shoulder cut.

Referring next to FIG. 2, a log 20 has been drilled along its control axis to provide a mounting hole 21. The drill jig assembly 7 of FIG. 1 could perform this operation. The tenonizer 1 has cut a radius shoulder tenon 27 into the log 20.

Figure 3:
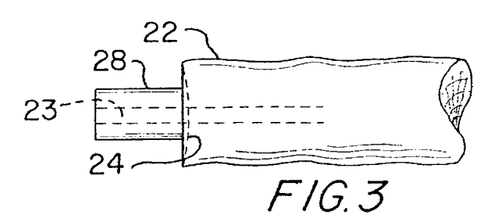
FIG. 3 is a side plan view of a workpiece having a square shoulder cut.

Referring next to FIG. 3, a log 22 has a mounting hole 23 along its control axis. A square shoulder tenon 28 has a slightly concave surface 24 at its shoulder.

Figure 4:
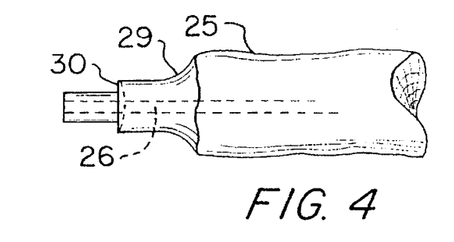
FIG. 4 is a side plan view of a workpiece having a hybrid radius square shoulder cut.

Referring next to FIG. 4 a log 25 has a mounting hole 26. A hybrid radius shoulder 29 and square shoulder 30 has been cut into it.

Figure 5:
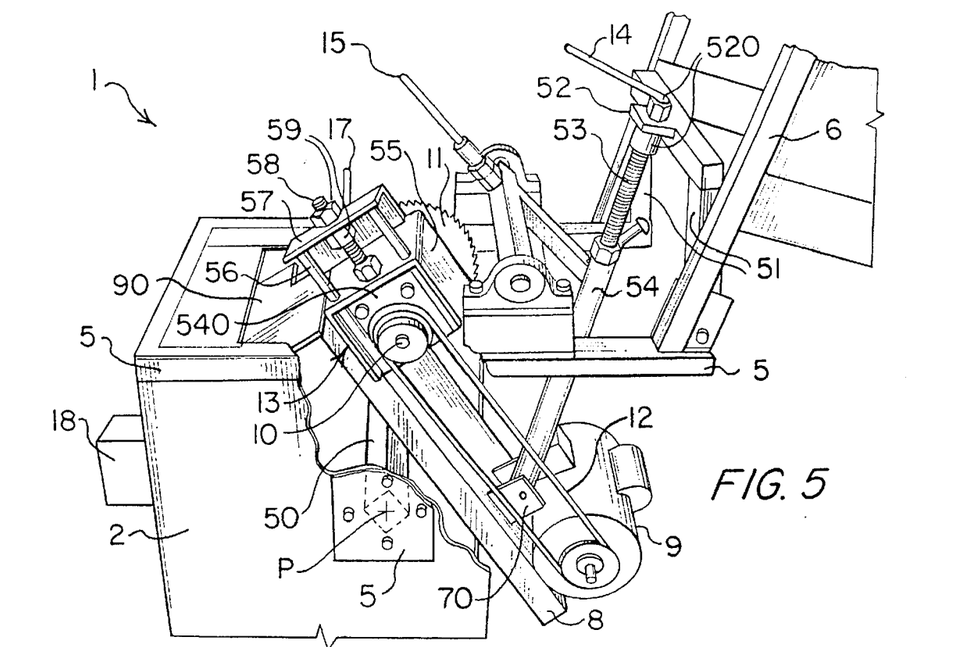
FIG. 5 is a right side perspective view of the preferred embodiment (no optional drill jig) having a partial cutaway.

Referring next to FIG. 5, the drill jig assembly 7 has been removed from the tenonizer 1. The safety shield 6 has been pivoted upward. A shaft 50 pivots about point P and supports the mounting platform 8. By adjusting crank arm 14 the threaded piston 53 forces the cylinder 54 to the desired position. A brace 51 extends from the frame 5. The collar 52 is secured to the brace 51 to provide a support for the threaded piston 53 and locking bolts 520.

The square shoulder support shaft 17 is supported by a bracket 55 that extends upward from the mounting platform 8. The bracket 55 has a plate 540 that supports the arbor 10. Adjustment rods 56 slide through bracket 55 and support the support shaft bracket 57. The cutting depth is set by tightening the nuts 59 on bolt 58 at the desired setting.

Figure 6:
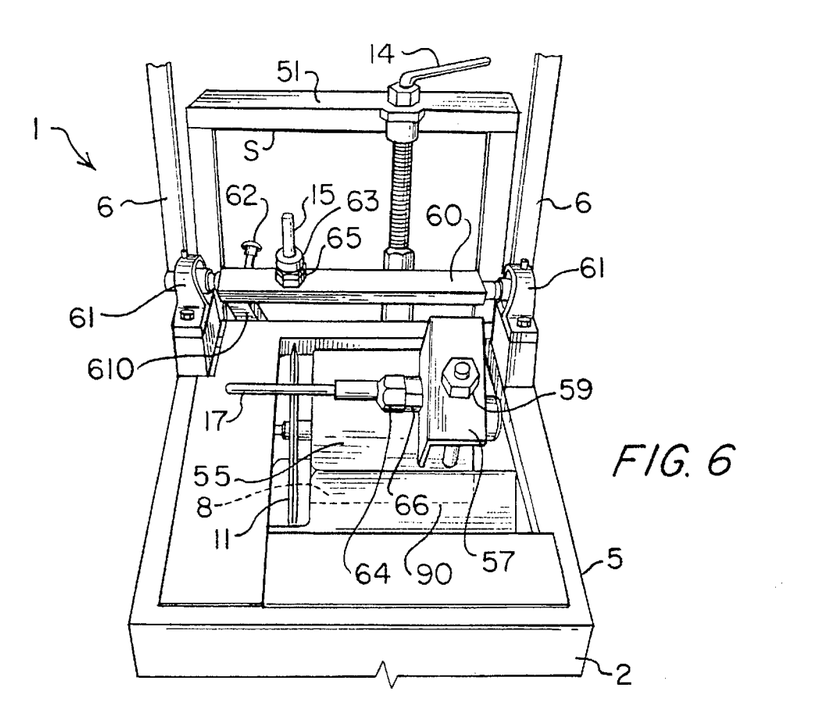
FIG. 6 is a front top perspective view of the preferred embodiment of FIG. 5.

Referring next to FIG. 6, the movement of the radius shoulder support shaft 15 can be clearly seen. A shaft 60 pivots inside brackets 61. A lever arm 610 extends from the shaft 60. The lever arm 61 has an adjustable stop bolt 62 which hits the brace 51 at point S. The radius shoulder support shaft 15 is interchangeable with a variety of desired width and length shafts by means of removing base 63 from nut 65. The square shoulder shaft 17 is interchangeable with a variety of desired width and length shafts by means of removing base 64 from nut 66.

Figure 7:
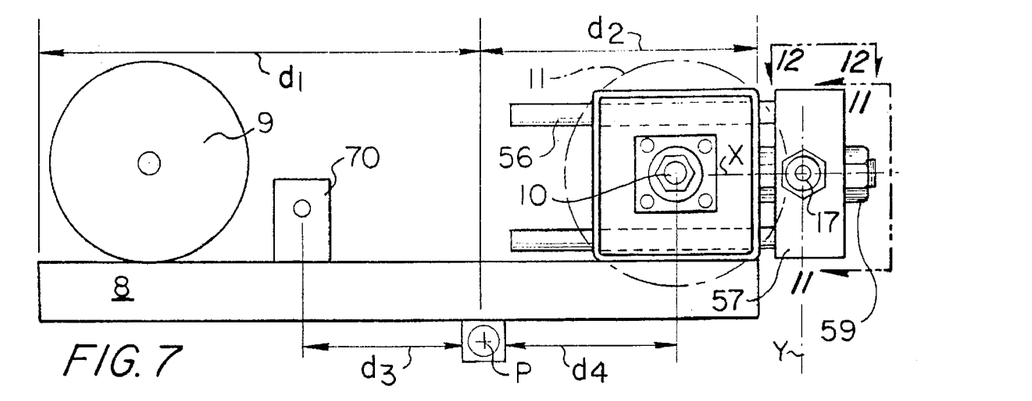
FIG. 7 is a left side plan view of the arbor and motor assembly.

Referring next to FIG. 7, the mounting platform 8 is seen in a left side plan view. The motor 9 is preferably a 1.5 to 2 HP motor at 3450 RPM with a 1-1 ratio. The bracket 70 secures the cylinder 54. The dado blade 11 could be a saber blade or other appropriate blade. Blade diameters should be 8, 9 or 10 inches. For best results the square shoulder support shaft 17 should be mounted at a 6° angle up the y axis and a 1½° angle right on the x axis as facing the shaft 17. Preferred dimensions are $d_1=16¼"$, $d_2=9¾"$, $d_3=6¾"$, $d_4=6¾"$.

Figure 8:
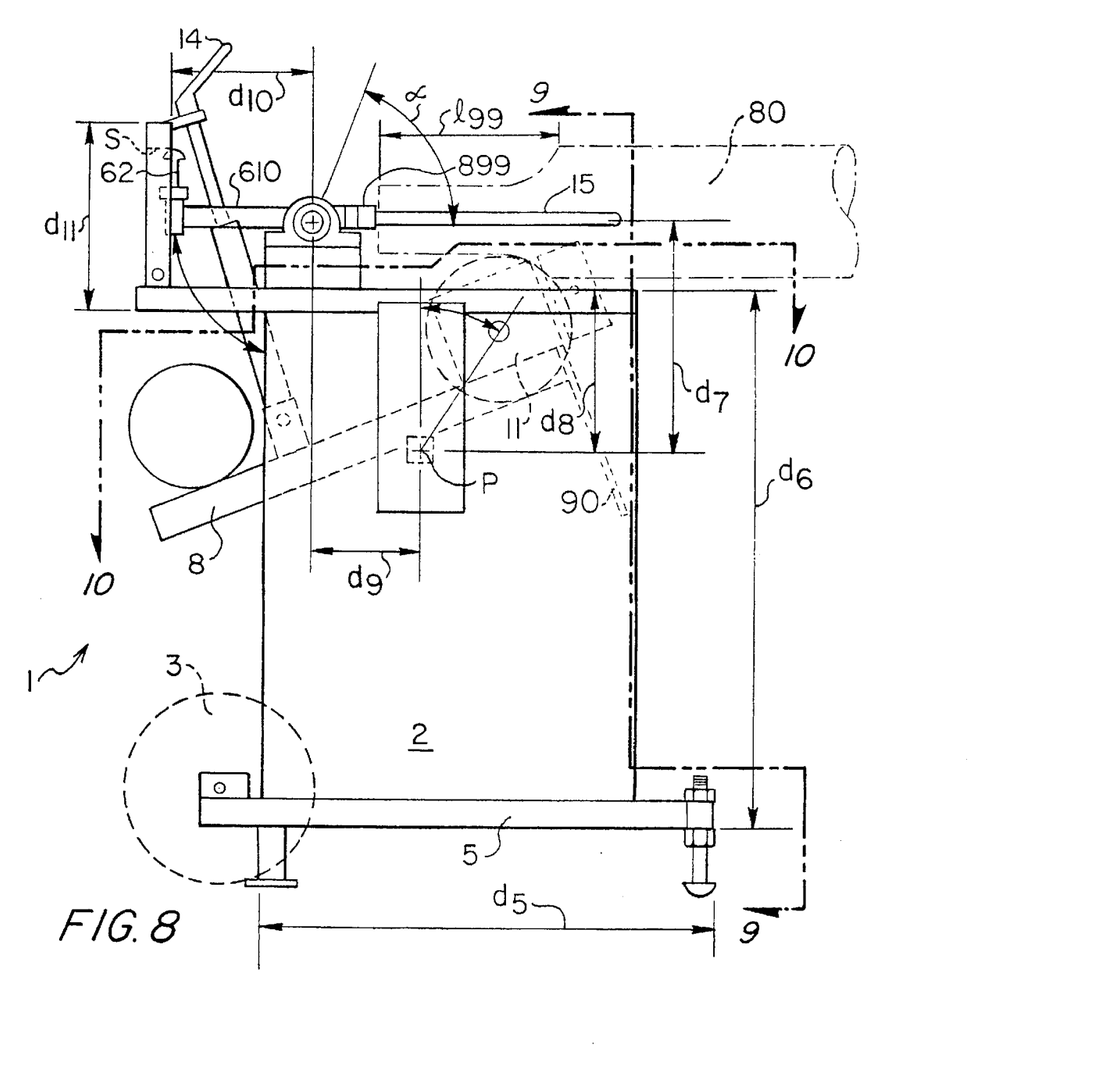
FIG. 8 is a left side plan view of the preferred embodiment showing a workpiece in dotted lines.

Referring next to FIG. 8, a workpiece 80 is seen in dotted lines mounted on the radius shoulder support shaft 15. The angle α represents the travel of the support shaft 15 during the cutting of the radius shoulder tenon. The preferred dimensions are $d_5=26½"$, $d_6=31"$, $d_7=13⅛"$, $d_8=9½"$, $d_{10}=8¼"$. A shield 90 extends below the mounting platform 8.

Tuning the tenonizer 1 for the most accurate cut even to plus or minus five thousandths inch is done by choosing the shortest shaft base 899. Then the operator adjusts the tilt of mounting platform 8 to the desired tenon length. The diameter of the tenon is set by adjustable stop bolt 62.

Figure 9:
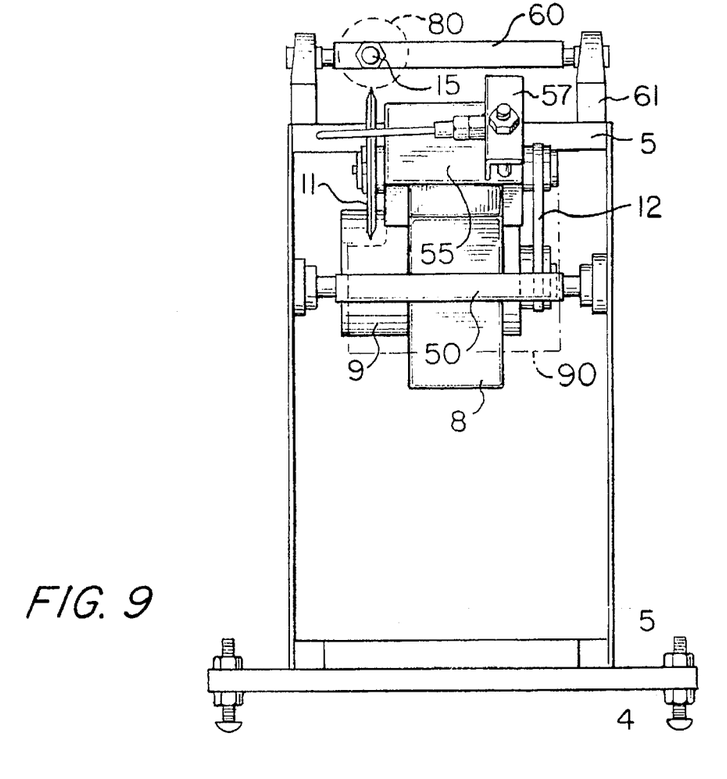
FIG. 9 is a front plan sectional view taken along lines 9—9 of FIG. 8.
Figure 10:
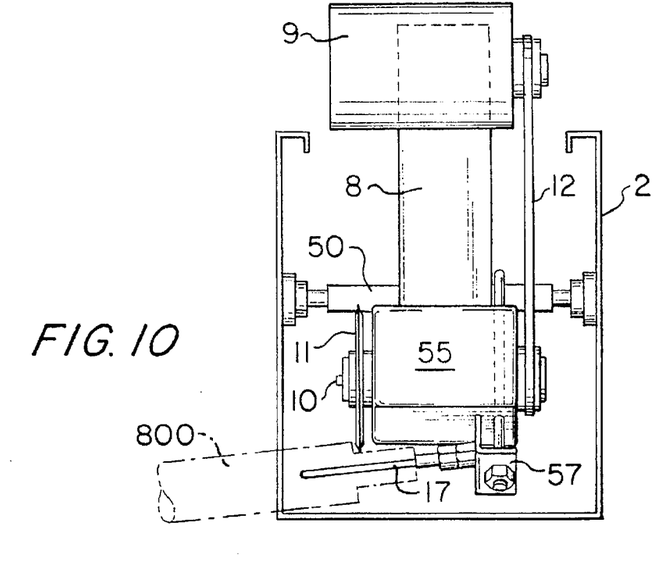
FIG. 10 is a top plan sectional view taken along line 10—10 of FIG. 8.

Referring next to FIG. 10, the workpiece 800 has replaced workpiece 80 of FIGS. 8,9. A square shoulder support shaft 17 is shown.

Figures 11, 12, 13, 14:
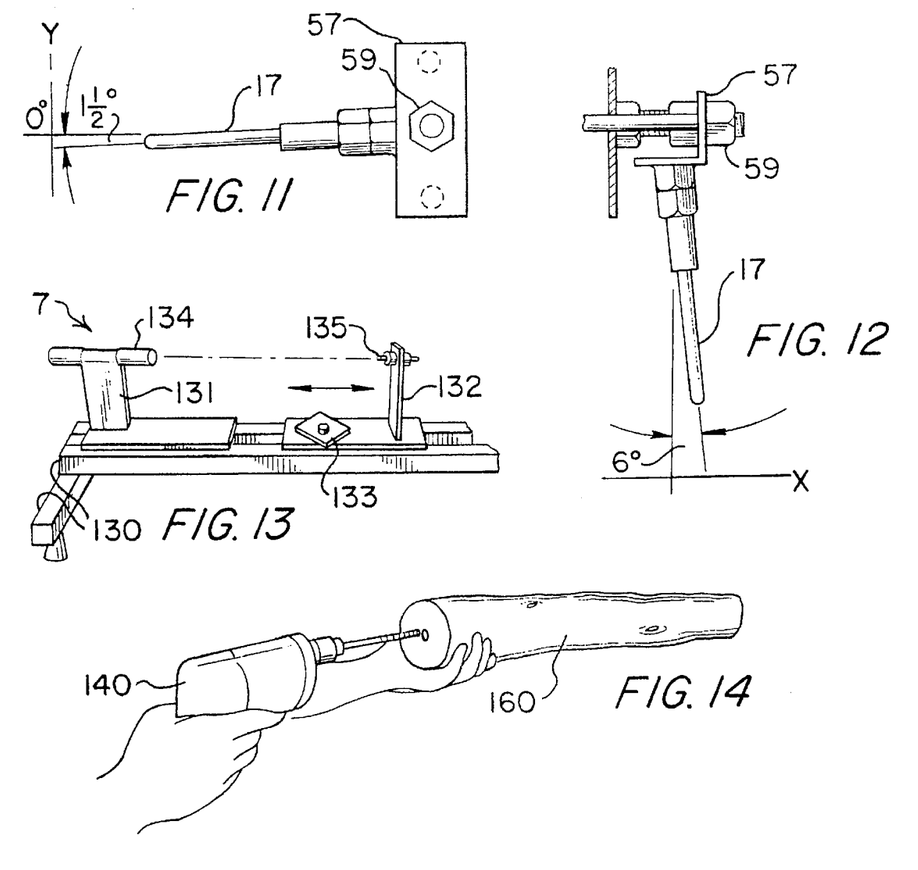
FIG. 11 is a front plan view of the square shoulder support shaft assembly taken along line 11—11 of FIG. 7.
FIG. 12 is a top plan view of the square shoulder support shaft assembly taken along line 12—12 of FIG. 7.
FIG. 13 is a top perspective view of a drill jig assembly.
FIG. 14 is a perspective view showing the first step in preparing a log.
Figure 15:
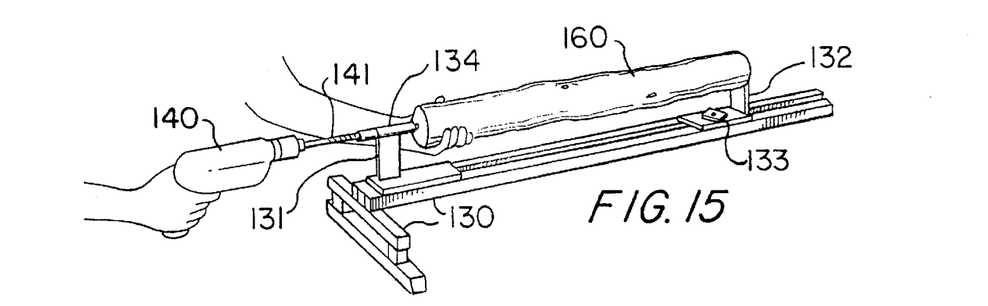
FIG. 15 is a top perspective view showing the second step in preparing a log.

Referring next to FIG. 12, the 6° preferred tilt for the square shoulder support shaft 17 is shown.

Figure 16:
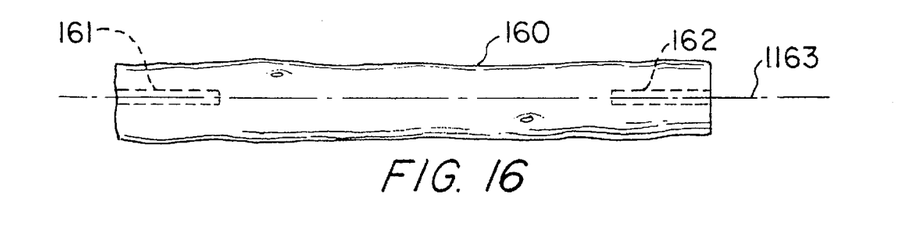
FIG. 16 is a side plan view of the log after it has been prepared by the drill jig by having a hole drilled at each end along the central axis of the log.

Referring next to FIGS. 13–16, the drill jig assembly 7 is shown dismounted from the tenonizer 1. The frame 130 supports the headstock support 131 and the tailstock support 132. A nut 133 allows the distance between the headstock and tailstock supports to be properly adjusted to the workpiece. The tailstock pin 135 supports the tailstock. The following steps are used to create the holes 161, 162 along center axis 1163 of workpiece 160 as shown in FIG. 16.

1. Take the workpiece 160 and mark the desired location of the tenon center. The tenon may be placed in the center of the material, but it may also be located at any position on end of material.
2. Mark the corresponding point on the other end of the workpiece 160.
3. Without placing the workpiece 160 in the drilling jig bore a ½" diameter hole about ½ of an inch deep at points marked for tenon center. Use a brad point drill bit. The workpiece 160 is ready to be placed on the drilling jig 7.
4. Adjust the position of the tailstock support 132 on the drilling jig to the length of the workpiece 160. The tailstock position equals length of material plus ¼ inch.
5. Place one end of the material on center support pin 135 and bring the other end into place in front of the headstock support 131.
6. Using drill 140 with a ½×12 inch drill bit 141, bore hole to a depth of at least 5½ inches using the drill bit guide 134.
7. Repeat procedure on opposite end of the workpiece 160. Oil the drill bit as needed.

Figure 17:
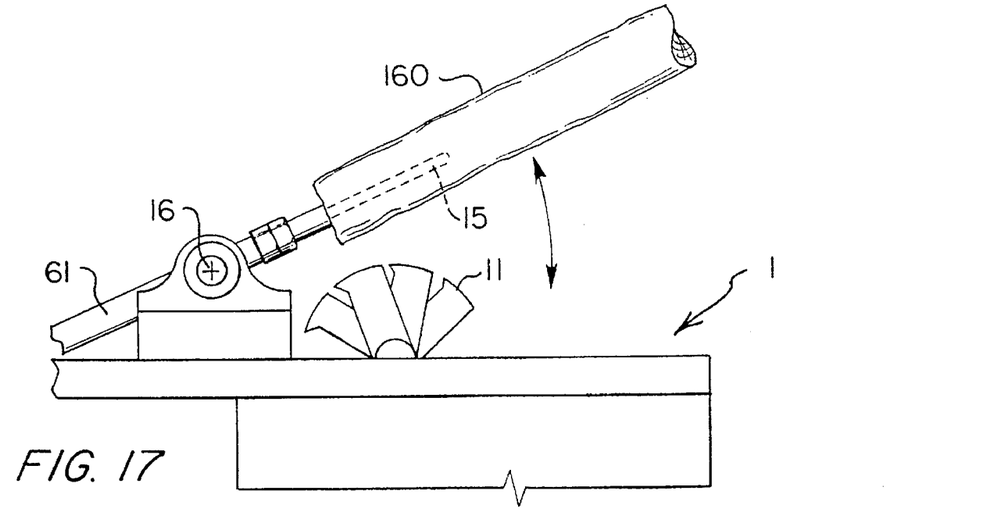
FIG. 17 is a left side plan view of a workpiece about to have a radius shoulder tenon cut into it.
Figure 18:
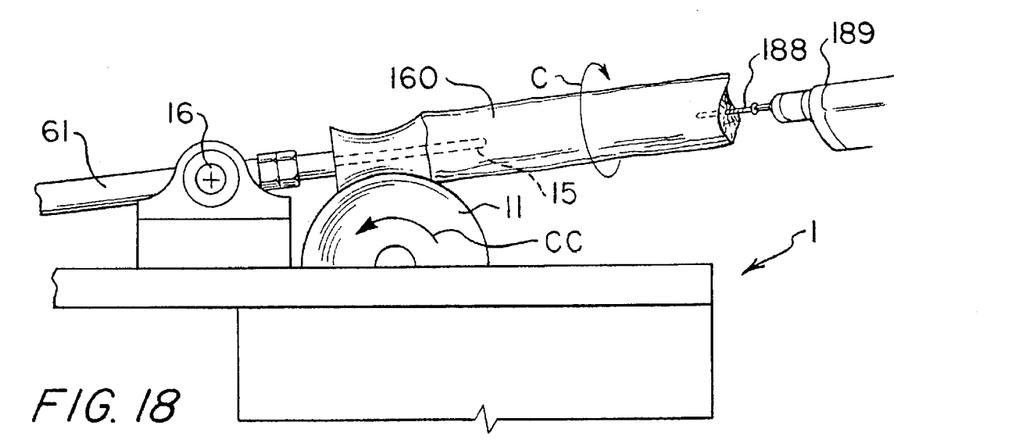
FIG. 18 is a left side plan view of the workpiece of FIG. 17 partially lowered and rotated into the dado blade.
Figure 19:
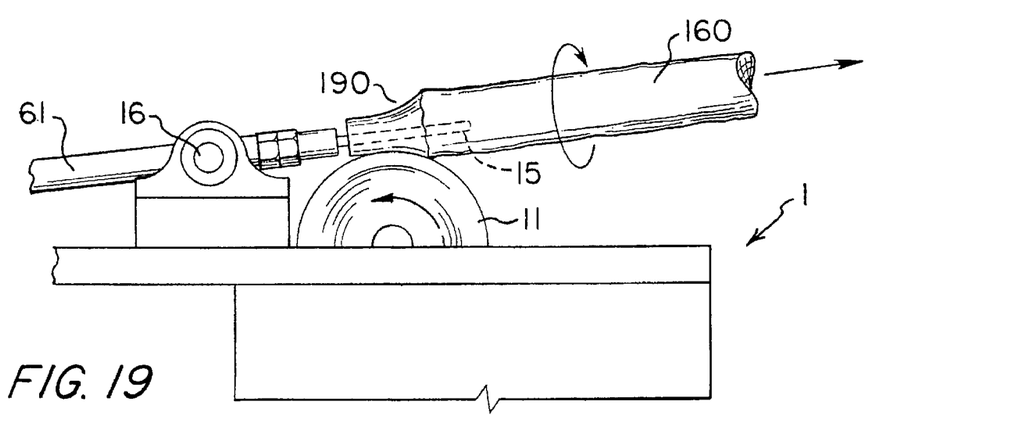
FIG. 19 is a left side plan view of the workpiece of FIG. 17 being removed from the radius shoulder support shaft.

Referring next to FIGS. 17, 18, 19, the steps for cutting a radius shoulder tenon on workpiece 160 of FIG. 16 are shown. First in FIG. 17, the workpiece 160 is mounted onto the radius shoulder support shaft 15. Second with the dado blade 11 spinning counter-clockwise per arrow CC (to throw the chips away from the operator) the workpiece is simultaneously rotated clockwise per arrow C and lowered to the lowermost position the radius shoulder support shaft has been adjusted to travel. After the cutting has been completed all around the tenon end, the workpiece 160 is removed while continuing the clockwise rotation as shown in FIG. 19. If desired a power drill 189 can be used to rotate the workpiece 160 by means of turning a screw 188 in the workpiece end.

Figure 20:
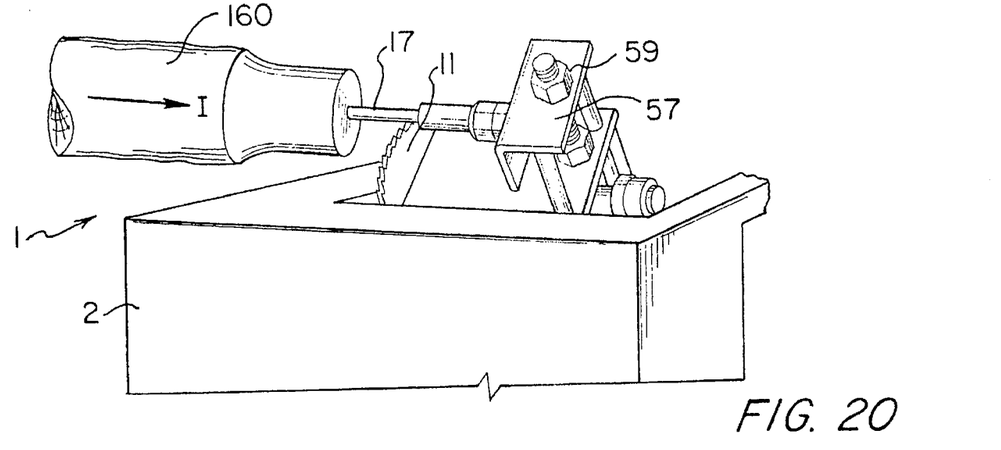
FIG. 20 is a front perspective view of a workpiece about to have a square shoulder tenon cut into it.
Figure 21:
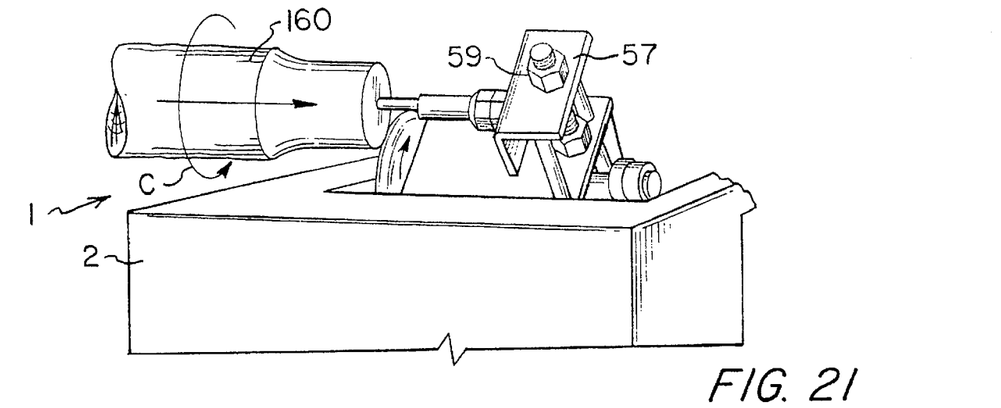
FIG. 21 is a front perspective view of the workpiece of FIG. 20 being pushed and rotated into the dado blade.
Figure 22:
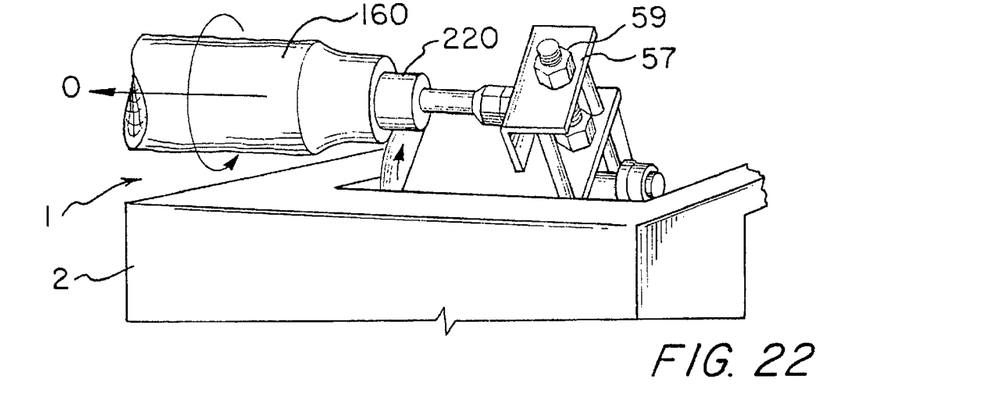
FIG. 22 is a front perspective view of the workpiece of FIG. 20 being withdrawn from the square shoulder support shaft.

Referring next to FIGS. 20–22 the steps for cutting a square shoulder tenon on the workpiece 160 of FIG. 16 are shown. The workpiece 160 of FIG. 16 are shown. The workpiece 160 is simultaneously rotated clockwise per arrow C and pushed in per arrow I to the dado blade 11. A square shoulder tenon 220 is shown in FIG. 22. The workpiece 160 is then removed in direction o.

Figure 46:
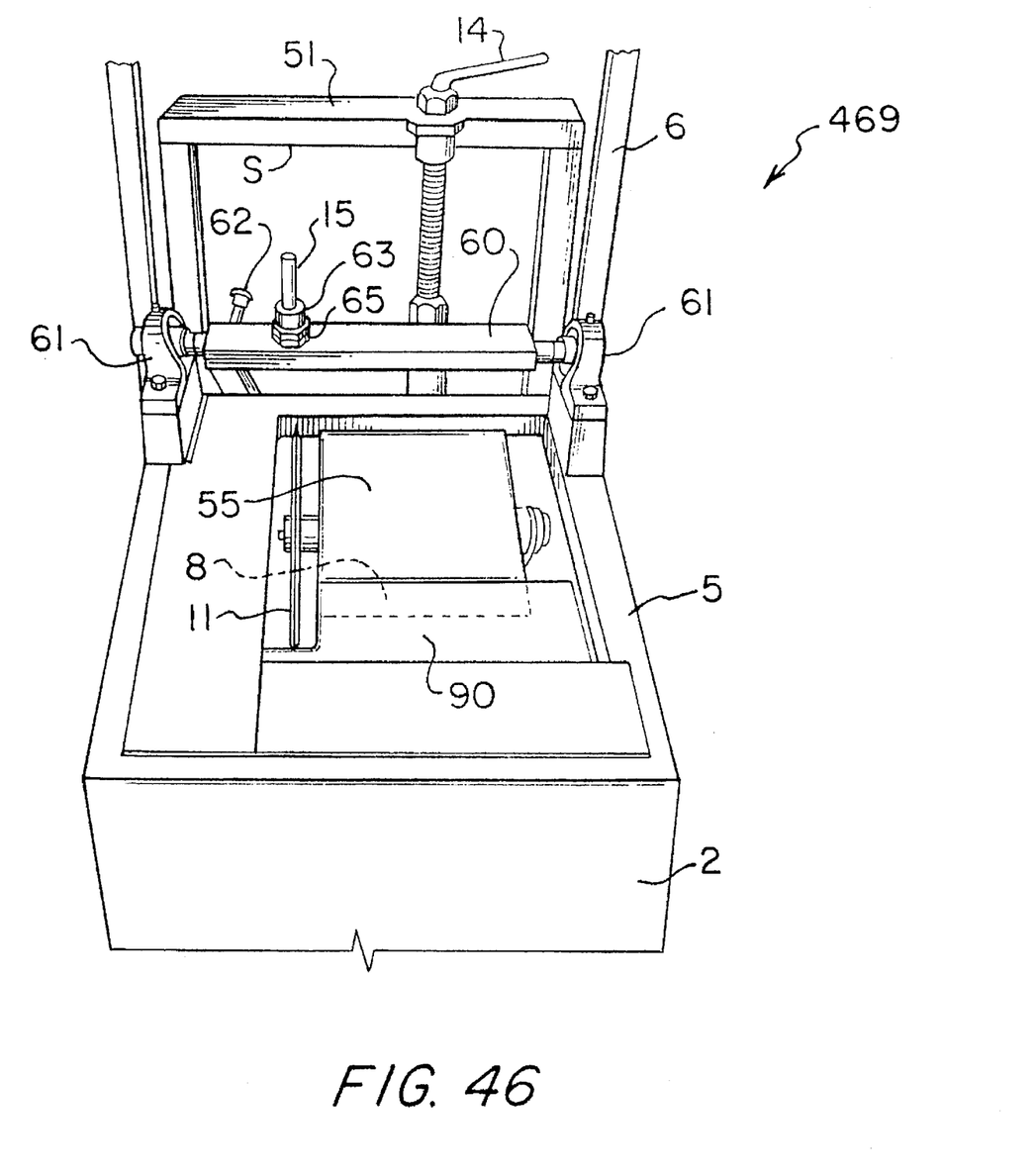
FIG. 46 is a front perspective view of an alternate embodiment having only a radius shoulder support shaft.

FIG. 46 shows a simplified tenonizer 469 which only has a radius shoulder support shaft. All the components are the same as the preferred embodiment shown in FIGS. 5,6 except the square shoulder tenon apparatus is deleted.

Below follows a summary of the features of the preferred embodiment shown in FIGS. 1–22.

Both radius shoulder axis shaft and square shoulder axis shaft operate independent of each other.

Square shoulder axis shaft position: from parallel and facing circular cutter 6 degrees up and 1½ degrees right.

Tenonizer is the only tenon cutting machine that is capable of cutting a circular tenon longer than two inches long.

Capacity Radius Shoulder Tenons:
smallest diameter ½ inch
largest diameter 5 inches
shortest length 0 inch (with radius shoulder)
longest length 9 inches.

Capacity Square Shoulder Tenons:
smallest diameter ½ inch
largest diameter 5 inches
shortest length 0 inch (creating a flat bottom)
longest length 4 inches Material Size Capacity:
maximum diameter 7 inches
maximum length 8 feet
minimum diameter 1 inch
minimum length 8 inches
maximum weight 60 pounds Circular cutter height adjustment works just the opposite of a table saw height adjustment.

Tenonizer is the only tenon cutting machine that cuts a radius shoulder tenon "with the grain," making a much smoother cut.

Tenonizer is the only tenon cutting machine that is designed to be job site portable.

Tenonizer is the only tenon cutting machine that is adjustable, (One size fits all).

Tenonizer is the only tenon cutting machine that does not present an operator threat by having the material break free of its mounting and fly around the room.

Fabricating capabilities range from a mortise and tenon log circle stairway to a child's rocking horse, and everything in between.

Procedure for Manufacturing a Log Circle Stairway Using the Tenonizer.

Figure 23:
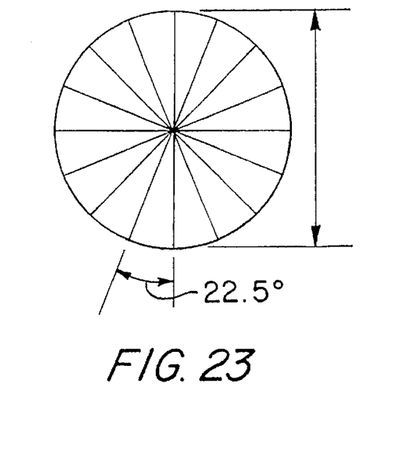
FIG. 23 is top plan schematic of a circular staircase to be made by the apparatus shown in FIG. 1.
Figure 24:
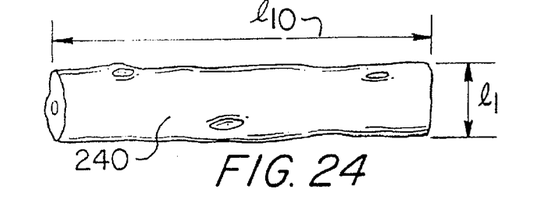
FIG. 24 is a side plan view of a raw workpiece log.
Figure 25:
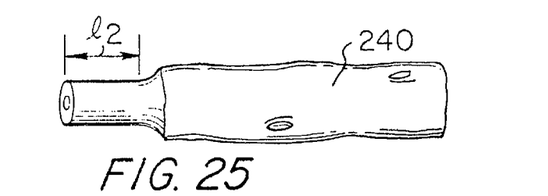
FIG. 25 is a side plan view of the workpiece log of FIG. 24 having a radius shoulder tenon at one end.
Figure 26:
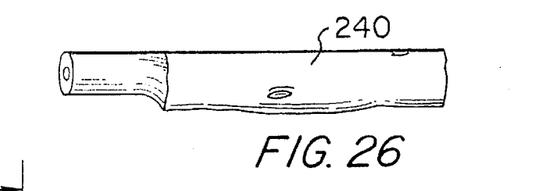
FIG. 26 is a side plan view of the workpiece of FIG. 25 having a milled flat surface parallel to the tenon.
Figure 27:
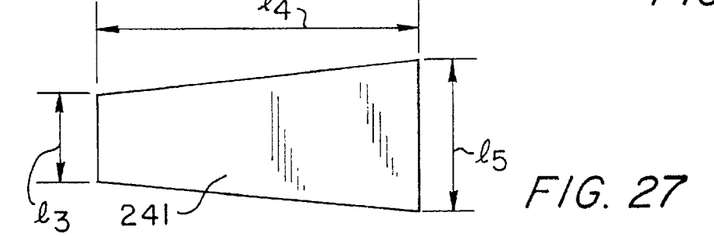
FIG. 27 is a top plan view of a stair tread.

1) Choose correct spacing of stair treads
   EXAMPLE
   Finished floor to finished floor=112.5"
   Total height=112.5"
   Height Per Tread=7.5"
   Total Risers=15
   Total Treads=14
2) Choose stairway diameter and degrees of rotation per tread, see FIG. 23.
   EXAMPLE
   Total diameter=6'0"
   Total circumference=28.26'
   Total number of degrees per tread=22½ degrees or 16 treads per rotation
   Total width in walking path=9½"
3) Choose material for stair tread logs 240, see FIG. 24 where
   $l_1$=6 inches and $l_{10}$=44 inches.
   Total pieces=14
   Length each piece=44"
   Diameter each piece=6"
4) Cut Tenon on one end of each stair tread log. See FIG. 25 where $l_2$=8 inches.
5) Using a jointer, mill a flat spot parallel to tenon surface. See FIG. 26.
6) Cut stair treads 241 to fasten to stair tread logs 240. Use 1¼" plywood to have carpet rap after installation. See FIG. 27 where $l_3$=8, $l_4$=30", $l_5$=14".

7) Choose log 242 for circle stairway center pole. Must be straight. Must be dry 15% moisture content, where $l_6$=12 feet, $l_7$=10", $l_8$=12". See FIG. 28. See FIGS. 28,29.

Figure 28:
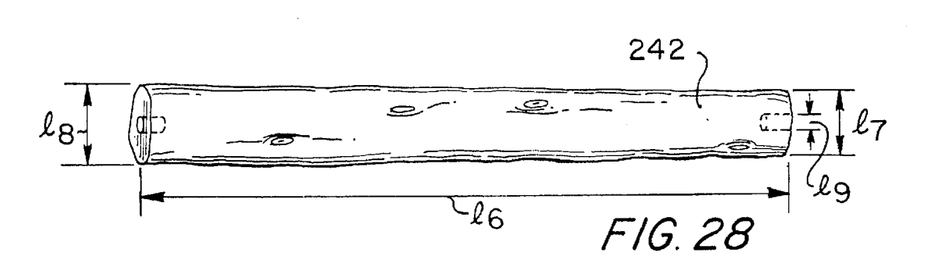
FIG. 28 is a side plan view of the stairway center pole.

Drill 2" deep, ¾ diameter hole $l_9$ in center of each end of center pole 242.

Diameter at base=12"
Diameter at top=10"
Trimmed Length=12"

Figure 29:
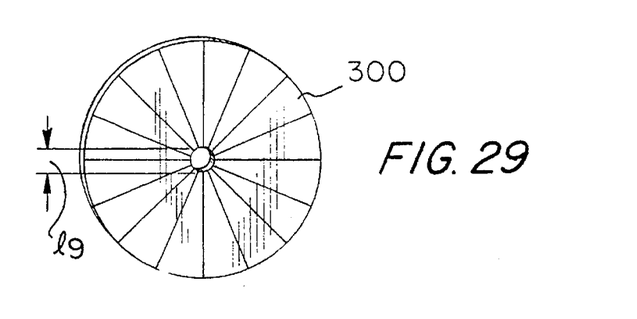
FIG. 29 is a top plan view of a pair of plywood circles.

Cut 2 pieces of plywood circles, 300. A matching set at 2' diameter. 16 treads per full rotation. Mark for degrees of rotation=22½ degrees. Drill ¾ diameter hole in center of each.

Figure 30:
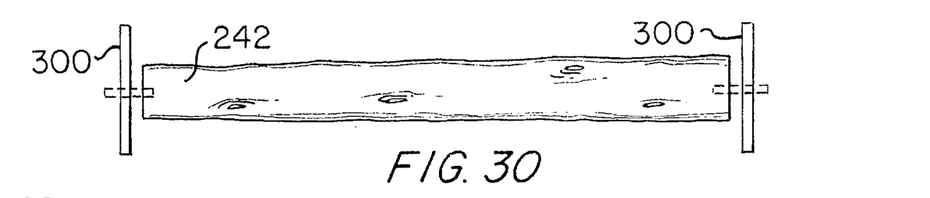
FIG. 30 is a side plan view of the center pole having the pair of plywood circles attached.

Matching ¾" holes, fasten one plywood circle to each end of center pole.

Figure 31:
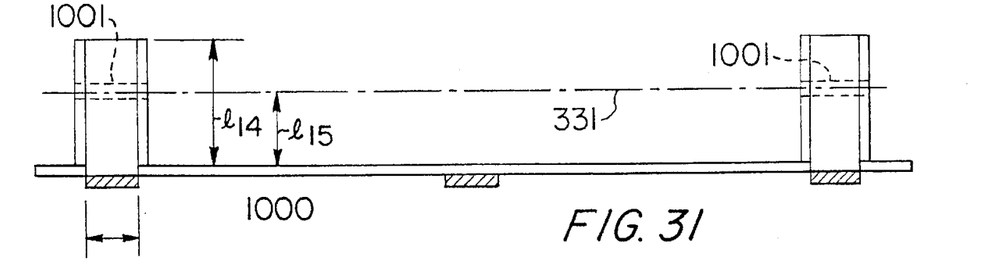
FIG. 31 is a side plan view of a jig holding the center pole.
Figure 32:
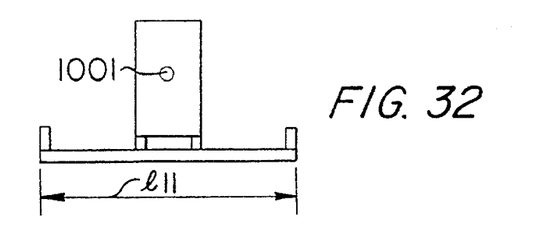
FIG. 32 is an end view of the jig of FIG. 31.

10) See FIGS. 31, 32. Make a jig 1000 to hold center pole for turning and drilling. Each end of stairway pole supported by ¾ steel shaft 1001, whose $l_{14}$=24", $l_{15}$=14", $l_{11}$=48".

Figure 33:
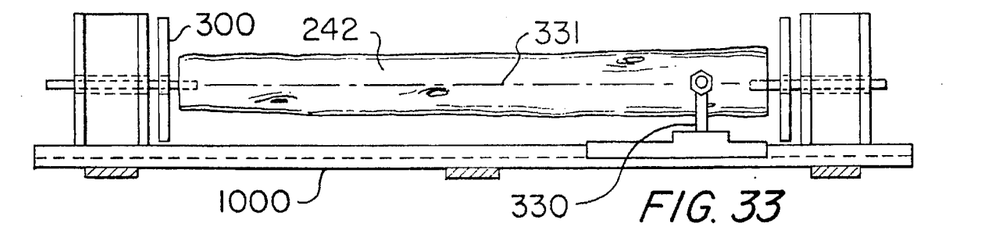
FIG. 33 is a side plan view of the jig of FIG. 31 having a drilling jig in position.

11) Using drilling jig 330 to drill a pilot shaft hole for each stair tread log, align drilling jig to slide along length of stairway pole, to move up 7.5" for each ½" diameter pilot hole to be drilled. See FIG. 34. Drilling jig 330 must be set axis line 331 of stairway center pole. Headstock of drilling jig mount to slide on rails set at +87°.

Figure 34:
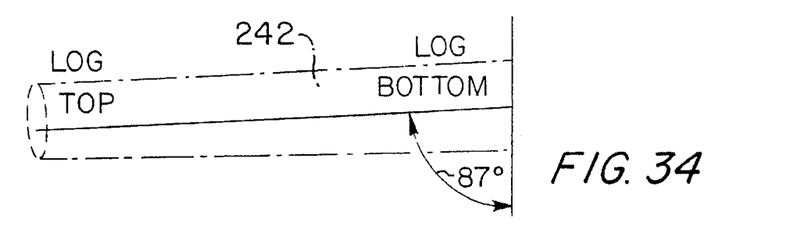
FIG. 34 is a top view of the jig of FIG. 33 showing the drilling jig set at an 87° angle relative to the center axis of the center pole.

12) See FIG. 34. Position drilling jig to 87° to axis line. That way, once stairway is complete, each stair tread will have a slight upwards tilt.

13) Mark position for first pilot hole, 3½" up from the base of the pole.

14) Using drilling jig, drill first ½" diameter pilot hole.

15) Turn the stairway center pole 22½ degrees or 16th of a turn and fasten.

16) Measure from base 11" to hole center and drill pilot hole.

17) Turn stairway center pole 22½ degrees or 16th of a turn and fasten.

18) Measure from base 18½" to hole center and drill pilot hole.

Figure 35:
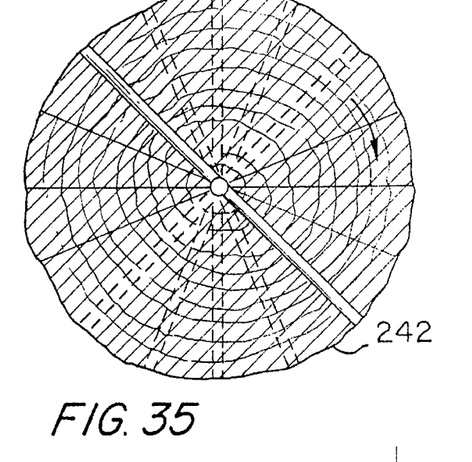
FIG. 35 is a cross sectional view of the center pole.

19) Continue process for all 14 treads, adding 7½" and a 16th of a rotation for each stair tread. See FIG. 35 for a cutaway of the center pole 242 of Stairway. For each pilot hole, continue ½" Diameter hole all the way through pole.

20) "Drill through" each pilot hole.

Figure 36:
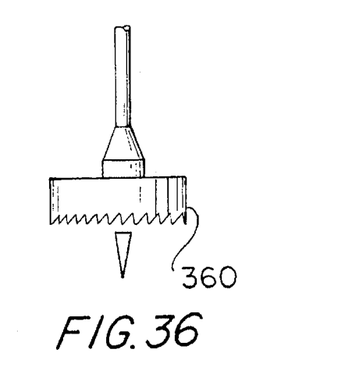
FIG. 36 is a side plan view of a flat bottom boring bit.
Figures 37, 38, 39:
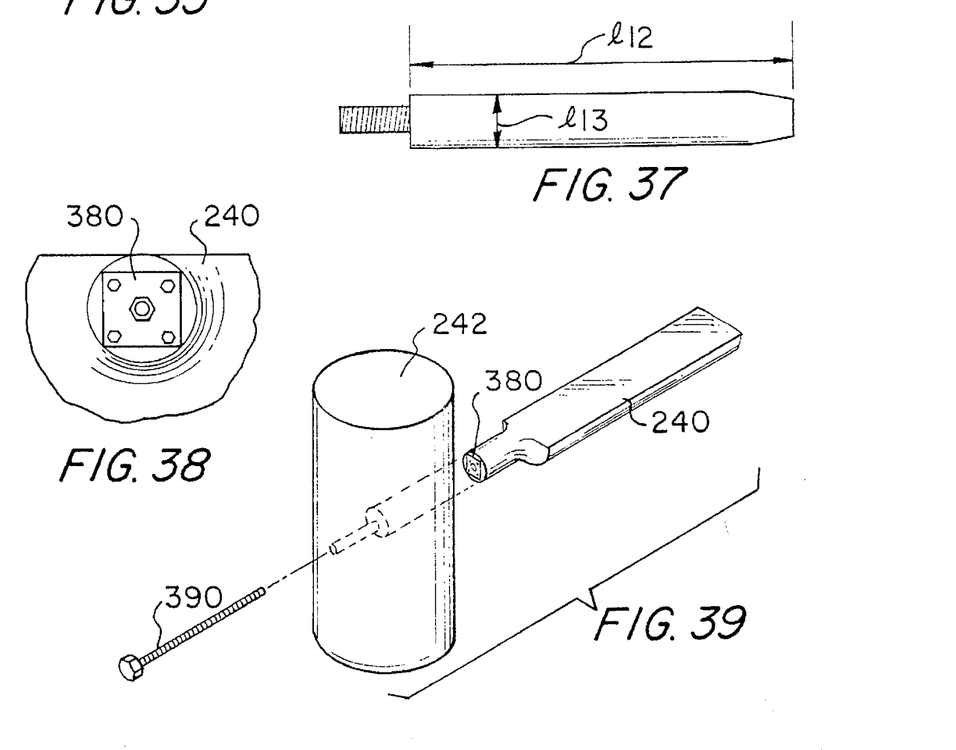
FIG. 37 is a side plan view of a guide shaft for the flat bottom boring a bit of FIG. 36.
FIG. 38 is an end view of the stair tread having a fastening plate bolted onto the tenon.
FIG. 39 is a top perspective view of the center pole and a stair tread.

21) See FIGS. 36,37. Take a 4⅝" flat bottom boring bit 360 and remove self feed point. Replace with a ½" diameter guide shaft 370 that extends 3" past the bottom of drill bit where $l_{12}$=3½", $l_{13}$=½".

22) Using the 4⅝" drill bit 360, drill stair tread holes to a consistent depth, that being when end guide bolt is flush with the side surface of the log. Stop drilling.

23) Using a 1⅝" forester bit, drill through "back side" of pilot hole to a depth of 1" for mounting bolt. (Put a plug in each hole after stairway is complete.)

24) See FIG. 38. To tenon end of each stair tread, fasten tightening plate 380.

25) Position center pole in place.

26) See FIG. 39. Cut 14 pieces of ½" threaded rod to 14" each and weld a nut on one end to form bolt 390.

27) Feed threaded rod through a washer, then through pilot hole, into stair tread fastening plate 380 and draw stair tread into place.

Figure 40:
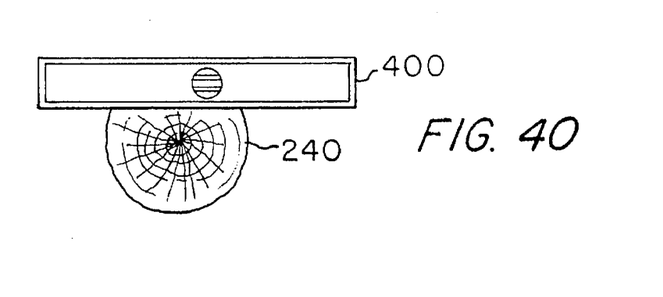
FIG. 40 is a level atop a stair tread to ensure tightening the stair tread with the flat upper side level.

28) See FIG. 40. Using level 400, level stair tread log 242 and fasten into place through sides.

29) Continue for each stair tread log.

Figure 41:
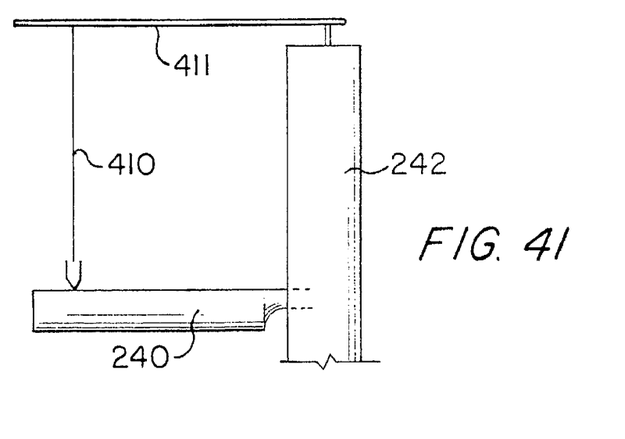
FIG. 41 is a front plan view of a stair tread being marked for the outside circumference.

30) Using a plumb line 410 tied to a radius arm 411 pinned to top of stairway in predrilled ¾" hole, mark outside circumference of stairway on stair treads logs 240.

Figure 42:
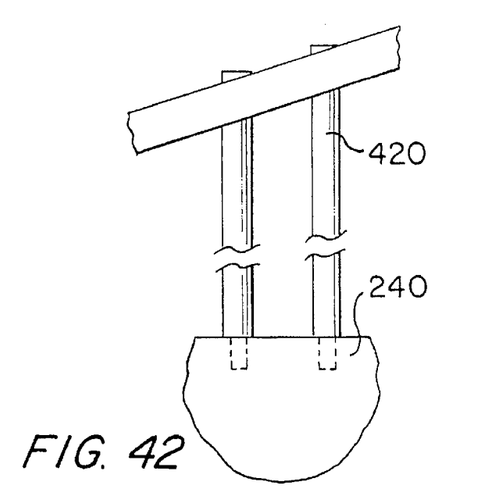
FIG. 42 is a front plan view of handrail spindles installed on the stair tread.
Figure 43:
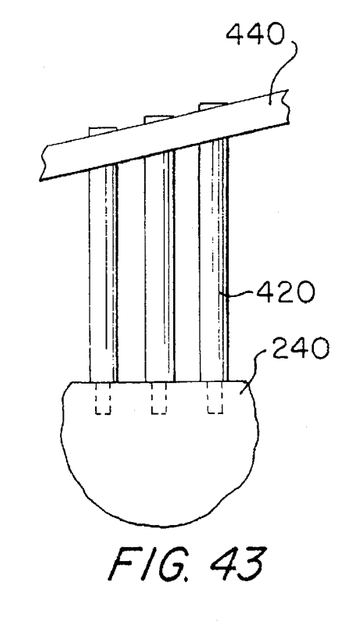
FIG. 43 is a front plan view of a three spindle per stair tread embodiment.

31) See FIGS. 42, 43. Install handrail spindles 420. Spindles may be fastened to stair treads, two or three for each stair tread by means of square shoulder tenons.

Spindles may be fastened to stair tread logs, two for each stair tread. Boards may be fastened to stair tread log ends.

Figure 44:
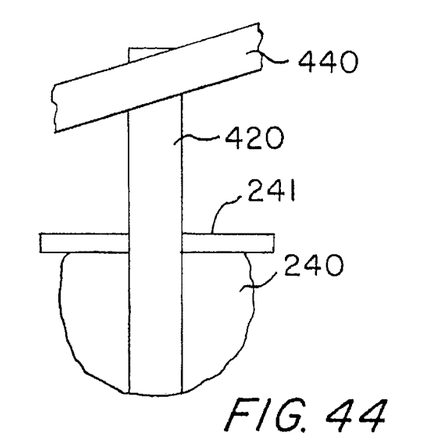
FIG. 44 is a front plan view of a stair tread installed on a stair tread log.

32) See FIG. 44. Fasten stair treads 241 to stair tread logs 240.

Figure 45:
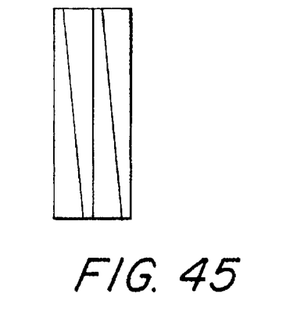
FIG. 45 is a cross sectional view of a redwood lap siding handrail embodiment having four glued lapsiding components.

33) See FIG. 45. Install handrail 440. Preferred system— Take 4 pieces of clear redwood lap siding [5½ by ⅜ butt], full length. Two up, and two down, glue and wrap in plastic. {Curing type glue, not air dry} Wrap around spindles and tie in place. Clamp approximate every 3" and leave to dry.

34) When hand rail is dry, unwrap, sand, permanently install.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A tenonizer apparatus comprising:

a circular cutting blade having a power means functioning to drive the circular cutting blade to cut a workpiece; and a radius shoulder support shaft having a pivotable support base means functioning to lower the workpiece into and parallel to the circular cutting blade to cut a radius shoulder tenon.

2. The apparatus of claim 1 further comprising a square shoulder support shaft having a support base means functioning to hold the workpiece in a perpendicular manner to cut a square shoulder tenon.

3. The apparatus of claim 2 further comprising a portable frame and cabinet having support means functioning to support the circular cutting blade and the power means at an adjustable distance from the radius and the square shoulder support shafts.

4. The apparatus of claim 2 further comprising a pivotable mounting platform means functioning to support the circular cutting blade and the power means at an adjustable distance from the radius and the square shoulder support shafts, thereby providing for adjustable length tenons.

5. The apparatus of claim 4, wherein the pivotable mounting platform means further comprises a variable length adjustment arm extending from the portable frame to one end of the pivotable mounting platform.

6. The apparatus of claim 5, wherein the variable length adjustment arm further comprises a cylinder having a threaded adjustable length piston therein.

7. The apparatus of claim 3, wherein the pivotable support base means further comprises a shaft having an extension arm which abuts a fixed frame member.

8. The apparatus of claim 7, wherein the extension arm further comprises an adjustable length bolt.

9. The apparatus of claim 4, wherein the support base means for the square shoulder support shaft further comprises a bracket affixed to the pivotable mounting platform and an adjustment rod slidably engaged in the bracket and a support shaft bracket affixed to the adjustment rod, whereby the adjustment rod can be locked at a desired distance form the circular cutting blade.

10. The apparatus of claim 2, wherein each of the radius shoulder support shaft and the square shoulder support shaft further comprises a removable fastening means functioning to provide interchangeable support shafts.

11. The apparatus of claim 3, wherein the frame further comprises a pivotable safety shield.

12. The apparatus of claim 1 further comprising a means to simultaneously push and pull and rotate the workpiece on the radius shoulder support shaft, thereby creating a radius shoulder tenon.

13. The apparatus of claim 12, wherein the means to simultaneously push and pull and rotate the workpiece further comprises a drill having a screw type bit affixed to an operator controlled end of the workpiece.

14. The apparatus of claim 2 further comprising a means to simultaneously push and pull and rotate the workpiece on the square shoulder support shaft, thereby creating a square shoulder tenon.

15. The apparatus of claim 14, wherein the means to simultaneously push and pull and rotate the workpiece further comprises a drill having a screw type bit affixed to an operator controlled end of the workpiece.

16. The apparatus of claim 2 further comprising a drill jig having a frame supporting a headstock support and a tailstock support.

17. The apparatus of claim 16, wherein the headstock support further comprises a drill bit guide, and the tailstock support further comprises a tailstock support pin, and the tailstock support has a means to slide a desired distance from the headstock support functioning to support the workpiece.

18. A tenonizer apparatus comprising:

a circular cutting blade having a power means functioning to drive the circular cutting blade to cut a workpiece;

a means to support the workpiece perpendicular to the circular cutting blade functioning to hold the workpiece against the circular cutting blade to create a square shoulder tenon; and a means to support the workpiece parallel to the circular cutting blade to create a radius shoulder tenon.

19. The apparatus of claim 18, wherein the means to support the workpiece perpendicular to the circular cutting blade further comprises a base having a shaft, thereby providing for a rotational movement of the workpiece along the shaft.

20. The apparatus of claim 18, wherein the means to support the workpiece parallel to the circular cutting blade further comprises a base having a shaft, thereby providing for a rotational movement of the workpiece along the shaft.

* * * * *